Figure 1:
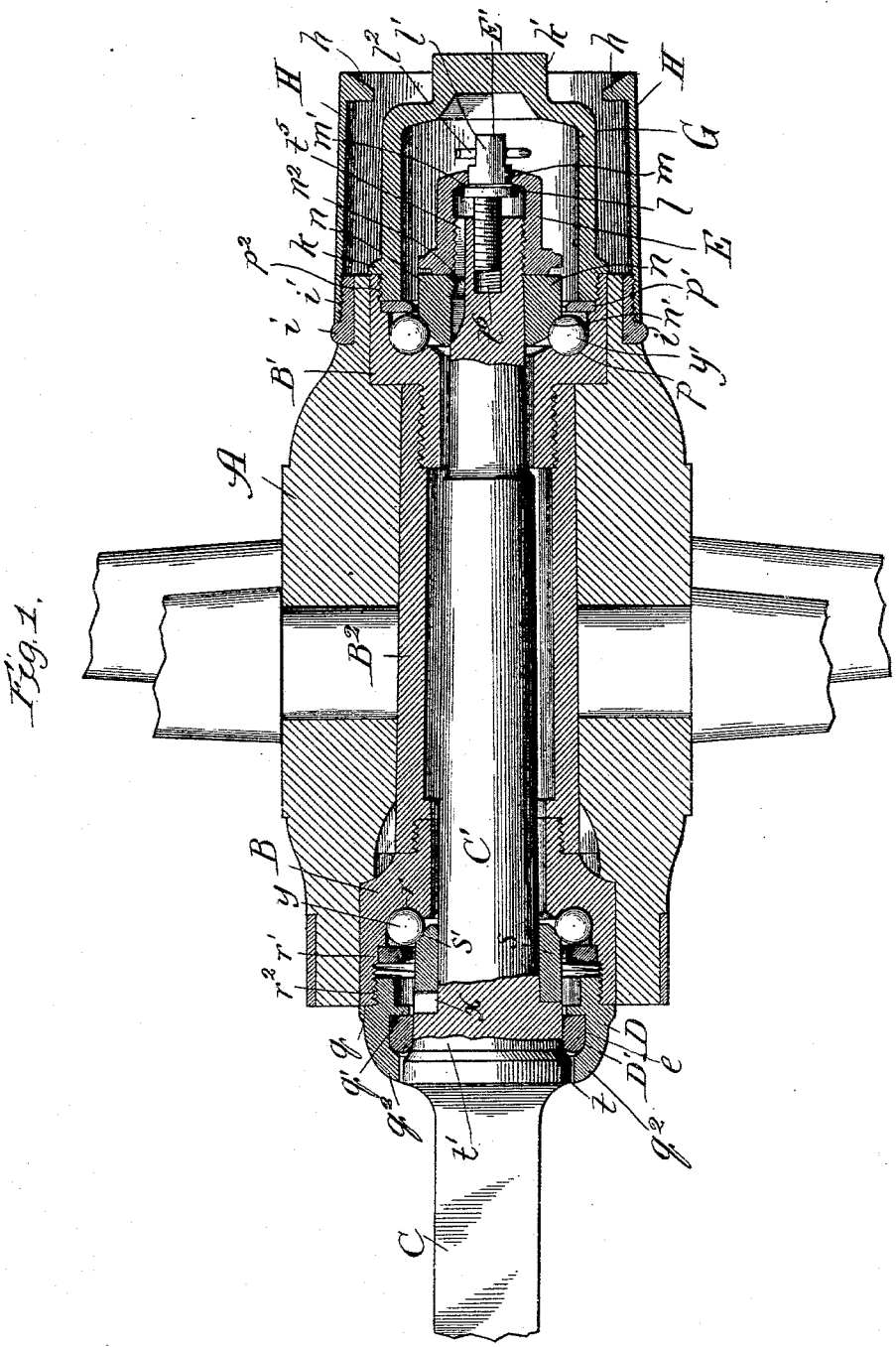

(No Model.) 2 Sheets—Sheet 1.

A. C. FARNSWORTH.
BALL BEARING AXLE.

No. 583,988. Patented June 8, 1897.

Witnesses:
Chas. E. Gaylord,
Lite' J. Alter

Inventor:
Andrew C. Farnsworth,
By Dyrenforth & Dyrenforth,
Attys.

(No Model.) 2 Sheets—Sheet 2.
A. C. FARNSWORTH.
BALL BEARING AXLE.
No. 583,988. Patented June 8, 1897.
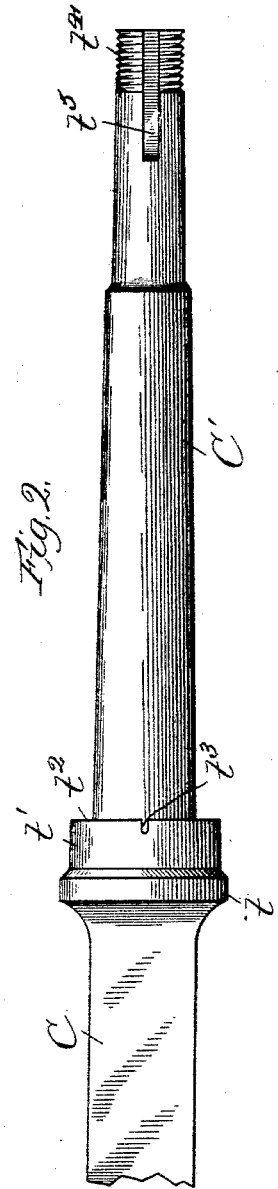
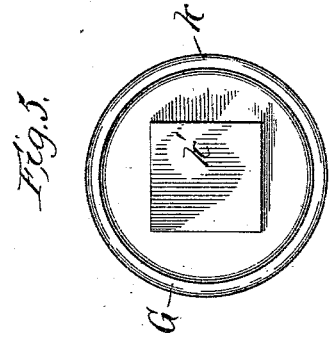
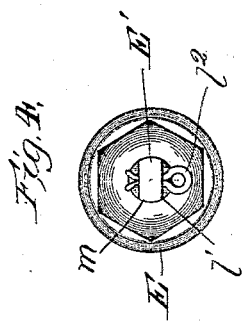
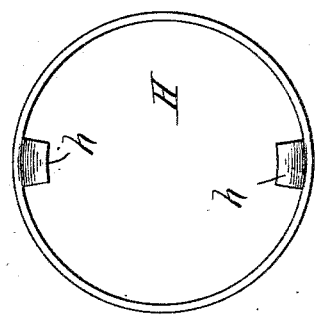
Witnesses:
Chas. E. Gaylord,
Little J. Alter.
Inventor:
Andrew C. Farnsworth,
By Dyrenforth & Dyrenforth,
Attys.

UNITED STATES PATENT OFFICE.

ANDREW C. FARNSWORTH, OF CHICAGO, ILLINOIS.

BALL-BEARING AXLE.

SPECIFICATION forming part of Letters Patent No. 583,988, dated June 8, 1897.

Application filed August 20, 1896. Serial No. 603,288. (No model.)

*To all whom it may concern:*

Be it known that I, ANDREW C. FARNSWORTH, a citizen of the United States, residing at Chicago, in the county of Cook and State of Illinois, have invented a new and useful Improvement in Ball-Bearing Axles, of which the following is a specification.

My invention relates to improvements in ball-bearing axles for buggies, carriages, and wagons generally. In axles of this class it is necessary, in order to render the bearings durable, easy running, and noiseless, to provide means for excluding dust from the races, as well as means for adjusting moving parts with great precision and for locking them securely in adjusted position.

My object is to improve upon the ball-bearing axles hitherto in use by providing a construction in which the adjustment may be effected with ease and great exactness and which prevents access of dust to the races to any appreciable extent in a comparatively extended time.

In the drawings, Figure 1 is a broken view showing one end portion of the ball-bearing axle, partly in elevation and partly in section, applied to the hub, also in section, of a vehicle wheel; Fig. 2, a broken elevation of a spindle portion of the axle; and Figs. 3, 4, and 5, outer end views, respectively, of a removable hub-ring or flange-piece, a jam-nut and lock therefor, and a cap or housing-cup, all forming details of my improved construction.

A is the hub of a vehicle-wheel, provided in its opposite ends with recesses in which are fitted boxes B B', screwed into the opposite ends of a sleeve $B^2$.

C is an axle having the head or flange $t$ and spindle C'. At the head $t$ and forming an integral part of the axle is a bearing part or surface $t'$, rendered slightly tapering in the direction of the end of the axle and terminating in an abrupt shoulder $t^2$. In the face of the shoulder $t^2$ is a recess $t^3$. The free end portion of the spindle is provided with a screw-thread $t^4$ and a longitudinally-extending recess $t^5$. Extending into the end of the spindle is a threaded socket $t^6$. Fitting upon the spindle and bearing against the shoulder $t^2$ is a cone or race member $s$, held against rotation upon the spindle by means of a key $x$, inserted into the recess $t^3$ and a coincident recess in the cone. The cone $s$ presents an annular ball-bearing surface $s'$. In the box B is the annular bearing-surface $r$ and adjacent thereto a preferably metal washer $r'$, which tends to confine the balls $y$ against dropping out. The outer end portion of the box B is provided with an internal screw-thread $r^2$.

D is a housing-ring provided at its inner end portion with an outer circumferential thread to fit the screw-thread $r^2$, a shoulder $q$ to bear against the end of the box, and an inner circumferential shoulder $q'$, fitting loosely around the surface $t'$ of the spindle. The ring D is of the shape shown in Fig. 1, being curved inward at the end and fitting at its end surface $q^2$ loosely around the surface of the head $t$. Between the shoulder $q'$ and surface $q^2$ of the ring D is an inner circumferential recess $e$, adapted to receive a preferably felt washer D'. The cone $s$ along its outer surface tapers, preferably, as shown, to coincide with the surface $t'$ of the spindle.

The box B' is provided with a ball-bearing surface $p$ and a washer $p'$, which confines the balls $y'$ against dropping out of the box. Beyond the washer $p'$ the box is provided with an inner circumferential screw-thread $p^2$. Fitting around the outer end portion of the spindle is a removable cone or race member $n$, having a ball-bearing surface $n'$ and an inwardly-projecting lug or pin $n^2$, which enters the groove $t^5$ of the spindle and holds the cone-piece against independent rotation.

E is the hub-retaining jam-nut, made in the form of a cup, with an internal screw-thread to engage the thread $t^4$ of the spindle. The nut or cup E is provided in its outer end with an opening $m$, surrounding which, on the inner side of the cup, is a bearing-shoulder $m'$. Screwed into the socket $t^6$ in the end of the spindle is a jam-nut lock or locking-screw E', having a flange $l$, presenting a shoulder to the shoulder $m'$, and a head $l'$, preferably squared for the engagement with it of a tool and passing through the opening $m$ of the jam-nut. In the outer end portion of the head $l'$ is an opening to receive a cotter $l^2$. The threads of the screw E' and socket $t^6$ are preferably at a different pitch from the threads in the jam-nut and on the end of the spindle.

G is a cap-piece or housing-cup which fits over the jam-nut E and is provided at its inner end with a thread to fit the screw-thread $p^2$ in the box B' and with an annular projection or shoulder $k$ to fit against the end of the said box. On the outer end of the cup is a boss or projection $k'$, squared to receive a suitable wrench. Surrounding the outer end of the hub is the usual metal reinforcing-ring $i$, which I provide with an outer circumferential screw-thread $i'$.

H is a hub-flange or housing-ring extending over the cup G and threaded at its inner end portion to screw upon the thread $i'$ of the ring $i$. In the outer end of the ring H are inward-projecting lugs $h$.

To place the wheel upon the spindle, the hub, with the boxes B B', containing the balls, and the ring D, containing the washer D', are passed over the end of the spindle into the position shown. In the movement of the ring D to the head $t$ the washer D', held in place by the shoulder $q'$, is crowded along the gradually-expanding surfaces of the cone $s$ and part $t'$ of the spindle, whereby it fits closely around the latter. The cone $n$ is then passed over the end of the spindle, its lug $n^2$ moving in the recess $t^5$. The locking-screw E', with the cotter $l^2$ removed therefrom, is screwed into the socket $t^6$, after which the jam-nut E is screwed upon the end of the spindle to force the cone or race member $n$ against the balls $y'$ and draw the cone or race member $s$ against the balls $y$. When the proper pressure against the balls is effected, the screw E', which passes through the opening $m$ of the jam-nut, is turned to bear at its shoulder $l$ against the shoulder $m'$ of the jam-nut and lock the same securely against turning. The cup G is then screwed into place, after which the ring H is placed in position, as shown.

By means of the jam-nut E, which holds the moving parts of the ball-bearings in contact, a very accurate adjustment may be effected, and this adjustment is not changed by the tightening of the screw E'. As before stated, the threads of the jam-nut and screw E' pitch at different angles, whereby any turning of the jam-nut in the direction of loosening it upon the spindle would, by its frictional contact with the shoulder $l$ of the screw, tend to tighten the latter more firmly against the shoulder $m'$. Thus it will be impossible for the jam-nut to change its position. It has been found hitherto that when the hub-retaining nut has been locked in place by a nut screwed against it from the outer end of the spindle the natural looseness between the threads would tend to cause the lock-nut when tightened to jam the retaining-nut inward and unduly tighten the adjustment. In the present construction the screw E' moves in the outward direction to lock the nut E, so that when the former is tightened against the latter it will have no tendency to force the race members against the balls to cause any binding effect upon the latter. The cotter-pin $l^2$ will prevent separation of the screw and jam-nut, so that there is no danger of loosening the screw when the jam-nut is removed from the spindle. The cup G completely houses the moving parts at the outer end of the spindle and prevents access of dust thereto. When the cup G is unscrewed from the box B', it is held against separation from the ring H by the lugs $h$, which project into the path of the annular shoulder or projection $k$. This is a desirable feature, as it prevents separation of these parts when they are removed from the cup. If from any cause the cup G becomes unscrewed from the box B', it will be prevented from falling out and being lost by the lugs $h$ of the ring H. To oil the bearings at the box B', it will only be necessary to unscrew the cup G, withdraw it toward the lugs $h$, and insert the neck of an oiler to the cone $n$. Thus the cup need not be removed from the head in the oiling operation. The washer D', which, as before stated, is preferably of felt, becomes saturated with oil and turns smoothly upon the surface $t'$. Owing to the fact that it is jammed into place, as described, it forms a very effective means for excluding dust from the box B.

While I prefer to construct my improvements in all parts as shown and described, they may be modified in the matter of details without departing from the spirit of my invention as defined by the claims.

What I claim as new, and desire to secure by Letters Patent, is—

1. In a ball-bearing axle, the combination of a hub, a spindle threaded along its outer side and provided in its end portion with a threaded socket, the threads of which are of a different pitch from those on the outer side of the spindle, ball-races and balls between the hub and spindle, a hub-retaining jam-nut screwed upon the spindle and provided in its end with an opening and a shoulder, and a locking-screw for the jam-nut passing through the opening therein and screwed into the said spindle-socket, and provided with an annular circumferential shoulder to bear in the outward direction against the shoulder on the jam-nut, substantially as described.

2. In a ball-bearing axle, the combination of a hub, a spindle threaded along its outer side and provided in its end portion with a threaded socket, the threads of which are of a different pitch from those on the outer side of the spindle, ball-races and balls between the hub and spindle, a cup-shaped hub-retaining jam-nut screwed upon the spindle and provided in its end with an opening and a shoulder on the inner side of said opening, and a locking-screw for the jam-nut, screwed into the said spindle-socket and having an annular circumferential shoulder to engage and bear in the outward direction against the shoulder on the jam-nut and a head passing through and beyond said jam-nut opening, substantially as described.

3. In a ball-bearing axle, the combination of a hub provided with an inner box and an outer box threaded at its outer end, a spindle provided at its inner end with a head and threaded along its outer end, a race member on the spindle at the head thereof, an adjustable race member on the outer end portion of the spindle, balls between the said boxes and race members, an adjustable hub-retaining jam-nut screwed upon the end of the spindle against said adjustable race member, locking means for the jam-nut, a dust-excluding housing-cup for the jam-nut, screwed upon the said outer hub-box and provided at its inner end portion with an outward-extending shoulder, and a hub-ring screwed upon the outer end of the hub and provided at its outer end portion with inward-projecting shoulders to engage the shoulder on the housing-cup and prevent withdrawal of the latter, substantially as described.

ANDREW C. FARNSWORTH.

In presence of—
J. N. HANSON,
R. T. SPENCER.